United States Patent [19]

Blacklaw

[11] Patent Number: 5,033,764
[45] Date of Patent: Jul. 23, 1991

[54] LOCKING TRAILER COUPLING

[76] Inventor: William Blacklaw, 4434 SE. 25th, Portland, Oreg. 97202

[21] Appl. No.: 533,101

[22] Filed: Jun. 4, 1990

[51] Int. Cl.$^5$ .............................................. B60D 1/06
[52] U.S. Cl. .................................. 280/508; 280/504; 280/514
[58] Field of Search ................ 280/504, 507, 508, 514

[56] References Cited

U.S. PATENT DOCUMENTS

| 1,955,876 | 4/1934 | Ferguson | 280/504 |
| 2,491,143 | 1/1947 | Weiss | 280/504 |
| 2,766,995 | 10/1956 | Weiss | 280/504 |
| 2,842,380 | 4/1956 | Weiss | 280/504 |
| 4,721,324 | 1/1988 | Blacklaw | 280/504 |

Primary Examiner—Charles A. Marmor
Assistant Examiner—Michael Shaughnessy
Attorney, Agent, or Firm—Chernoff, Vilhauer, McClung & Stenzel

[57] ABSTRACT

A trailer coupling which receives the annular eye of a drawbar over a rearwardly and upwardly-projecting pintle, has a latch which engages the pintle and overlies the drawbar to prevent the drawbar from becoming dislodged during use. The latch is rotatable forwardly toward the body of the hitch, which is attached to the towing vehicle, to uncover the drawbar and permit its installation onto and removal from the pintle. A pawl mounted on the body of the coupling engages a tang on the latch when the latch is in its latched position to prevent rotation of the latch to its unlatched position. Thus the latch cannot inadvertently open during use. The pawl can be rotated away from the latch when it is desired to install or remove the drawbar.

8 Claims, 2 Drawing Sheets

LOCKING TRAILER COUPLING

BACKGROUND AND SUMMARY OF THE INVENTION

This invention relates to a trailer coupling that receives a drawbar having an annular eye and has a locking mechanism that prevents accidental displacement of the drawbar from the coupling.

Trailer couplings that receive a drawbar having an annular eye on an upwardly-projecting pintle or a hook utilize two types of latches to prevent the drawbar from becoming accidentally dislodged from the pintle. In one type of coupling the latch rotates about an axis that is horizontally displaced from the pintle, thereby allowing the latch to be rotated upwardly and permit the drawbar to be inserted below it. On the other type of coupling the latch rotates about an axis which is vertically displaced from the pintle, thereby allowing the latch to be rotated forwardly to completely uncover the pintle. The advantage of this latter type of coupling is that the latch can be opened merely by pushing the drawbar rearwardly against the face of the latch. The disadvantage of the latter type of hitch is that it is difficult to make it as strong as the former type. Examples of couplings where the latch is lifted are Blacklaw, U.S. Pat. No. 4,721,324, Weiss, U.S. Pat. No. 2,842,380, Weiss, U.S. Pat. No. 2,766,995, and FIGS. 1 and 2 of Weiss, U.S. Pat. No. 2,491,143. An example of a coupling where the latch is rotated forwardly is FIG. 4 of Weiss '143.

All of the prior art drawbar-receiving couplings have a locking mechanism that prevents accidental opening of the latch. However, these locking mechanisms are either complex, which makes them expensive, or difficult to operate, which makes them commercially undesirable, or both.

The subject invention overcomes the foregoing shortcomings of the prior art couplings by providing a body that can be attached to a towing vehicle and has an outwardly and upwardly-projecting pintle that is configured to receive the eye of the drawbar. A latch that is rotatably mounted in the body is normally oriented in a latched position where it engages the extremity of the pintle to prevent removal or installation of the drawbar. The latch is rotatable forwardly toward the body to displace it from the pintle to allow removal or installation of the drawbar.

A pawl that is rotatably mounted on the body forwardly of the latch is normally oriented in a locked position where it engages the latch and prevents rotation of the latch from its latched position. When the drawbar is to be inserted onto or removed from the pintle, the latch can be rotated by first rotating the pawl to where it does not engage the latch. In a preferred embodiment of the invention, the latch includes a forwardly-projecting tang that is engaged by the pawl. In addition, the pawl has a rearwardly-extending lip that fits under the tang when the pawl is released after the latch is rotated to its unlatched position, thereby holding the latch open. Rotation of the pawl to its unlocked position again, releases the latch and allows it to rotate back to its latched position.

In operation, a drawbar can be connected to the coupling merely by rotating the pawl to its unlocked position, placing the drawbar against the face of the latch, and urging it forwardly to where it can be placed over the pintle. When the drawbar drops over the pintle the latch returns to its normally latched position where it prevents the drawbar from being removed from the pintle. The pawl is then released to prevent rotation of the latch from its latched position. When the drawbar is to be removed from the coupling the pawl is rotated to its unlocked position, the latch is rotated to its unlatched position and the drawbar is lifted off of the pintle.

Accordingly, it is a principal object of the present invention to provide a trailer coupling that accepts a drawbar having an annular eye and has a locking mechanism that is deactivated by rotating a single pawl.

It is a further object of the subject invention to provide such a trailer coupling in which the locking mechanism can be deactivated with one hand.

It is a still further object of the subject invention to provide such a trailer coupling that is inexpensive to construct and simple to operate.

The foregoing and other objectives, features and advantages of the present invention will be more readily understood upon consideration of the following detailed description of the invention taken in conjunction with the accompanying drawings.

PREFERRED EMBODIMENT OF THE INVENTION

Figure 1:
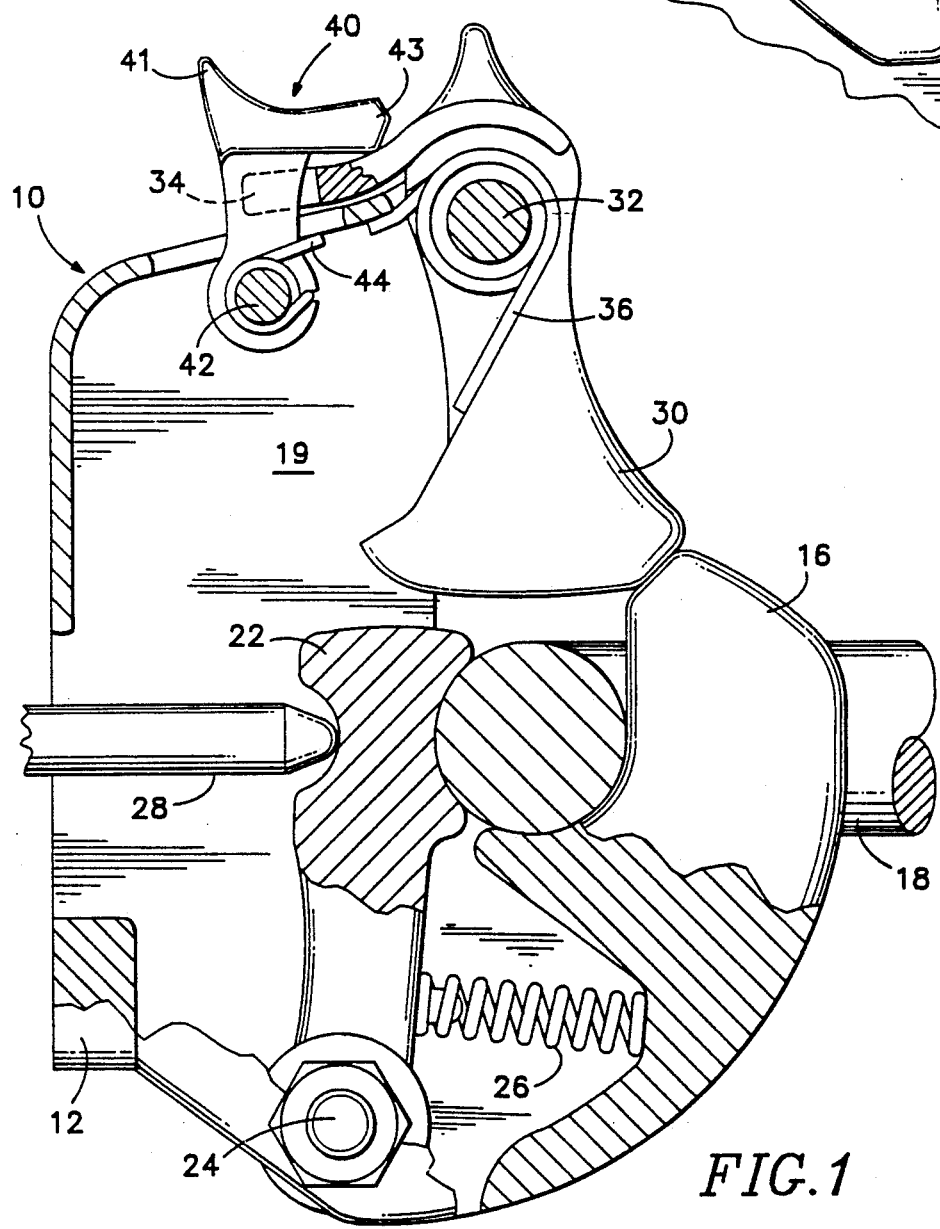
FIG. 1 is a side elevation view, partially broken away to show hidden detail, of a trailer coupling embodying the features of the subject invention.
Figure 2:
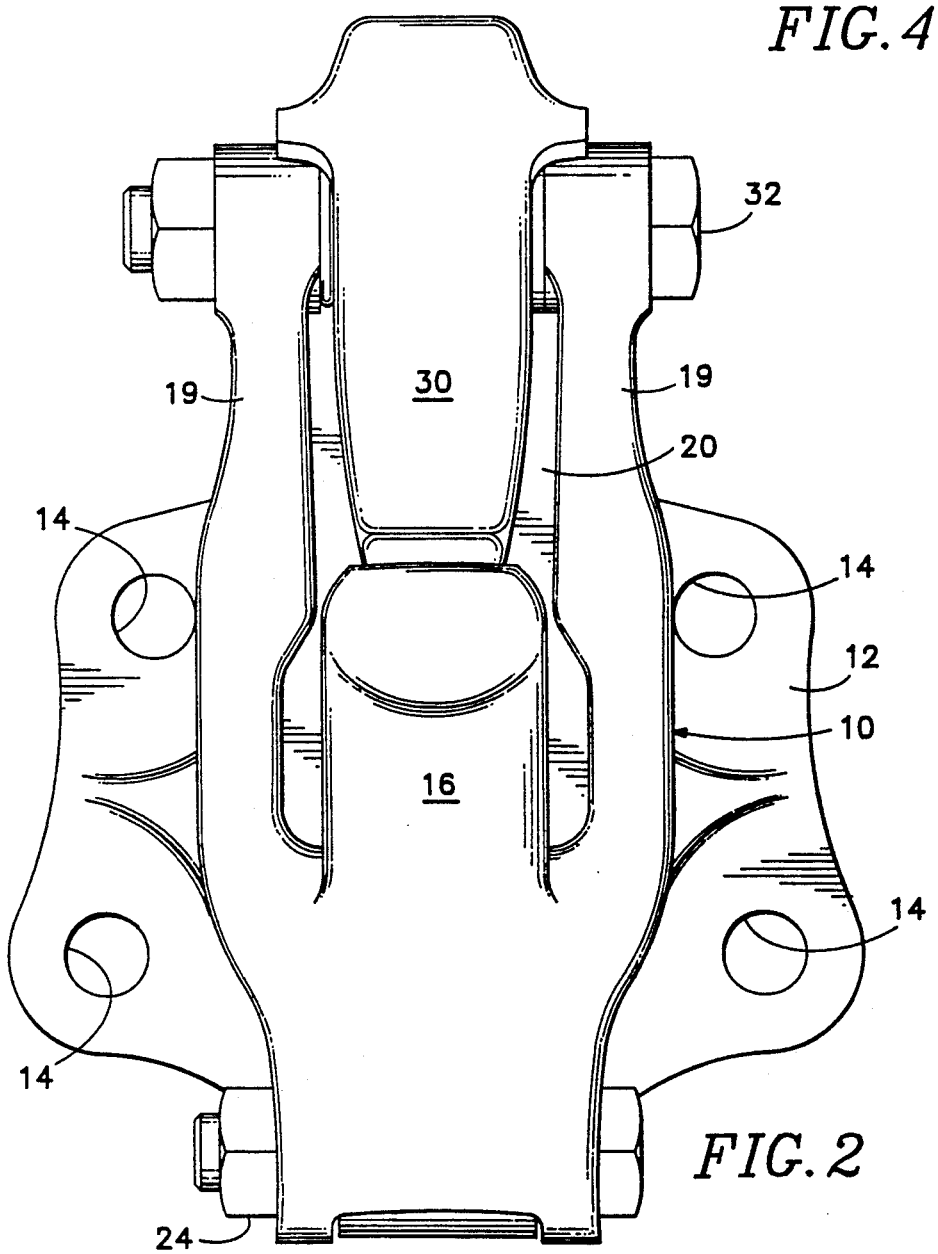
FIG. 2 is a rear elevation view of the trailer coupling.

Referring to FIGS. 1 and 2 of the drawings, the trailer coupling of the subject invention comprises a body 10 having a flat base 12 with bolt holes 14 at its corners to permit attachment of the coupling to a towing vehicle (not shown). Extending rearwardly and upwardly from the lower portion of the body 10 is a J-shaped pintle 16. The upwardly-extending portion of the pintle is cylindrical and is configured to receive the eye of a drawbar 18 that is attached to the device being towed (not shown). The upper portion of the body 16 includes spaced-apart side walls 19 that define a cavity 20 between them. Located at the bottom of the cavity is a friction shoe 22 that is pivotally mounted on a bolt 24 so that it can be placed into contact with the drawbar 18 after the drawbar is placed in the pintle. A spring 26 normally urges the friction shoe away from the drawbar in order to facilitate installation of the drawbar on the pintle, and a ram 28, which is coupled to a pneumatic cylinder (not shown), urges the friction shoe into contact with the drawbar after it is installed on the pintle.

Figure 3:
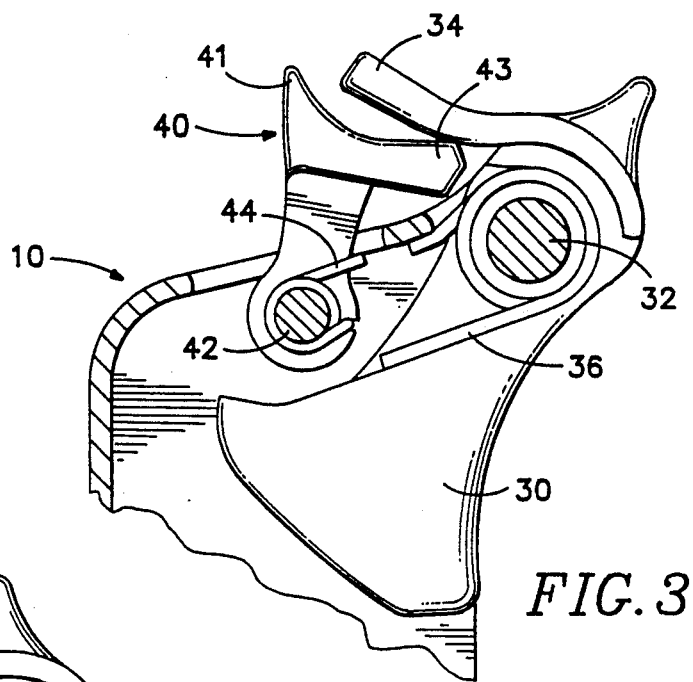
FIGS. 3 and 4 are fragmentary side elevational views, showing the operation of the coupling's locking mechanism.

Mounted rotatably in the body 10, between the side walls 19, is a latch 30. A bolt 32 extending through mating holes in the side walls and the upper rear portion of the latch allows the latch to rotate between a latched position, FIG. 1, where it engages the pintle and overlies the drawbar to prevent removal of the drawbar from the pintle, and an unlatched position, FIG. 3, where it is displaced from the pintle toward the body. The latch includes a tang 34 that extends forwardly from the remainder of the latch, on the opposite side of the bolt 32, and is positioned at the top of the cavity 20 when the latch is in its latched position. A spring 36 normally urges the latch to its latched position. The rearwardly-facing surface of the latch is arcuate which facilitates installation of the drawbar onto the coupling, as will be more fully explained later.

Located forwardly of the latch is a pawl 40 that also fits between the side walls 19 and is rotatably mounted on a bolt 42. The pawl 40 is rotatable between a locked position, FIG. 1, where it overlies the tang 34 to prevent raising of the tang, and thus rotation of the latch, and an unlocked position, FIG. 4, where rotation of the latch is possible. The pawl includes a rearwardly-extending lip 43 that fits under the tang on the latch when the pawl is returned to its locked position. A spring 44 normally urges the pawl to its locked position. A thumb grip 41 located at the upper extremity of the pawl permits the pawl to be rotated to its unlocked position simply by pushing forwardly against the thumb grip.

Figure 4:
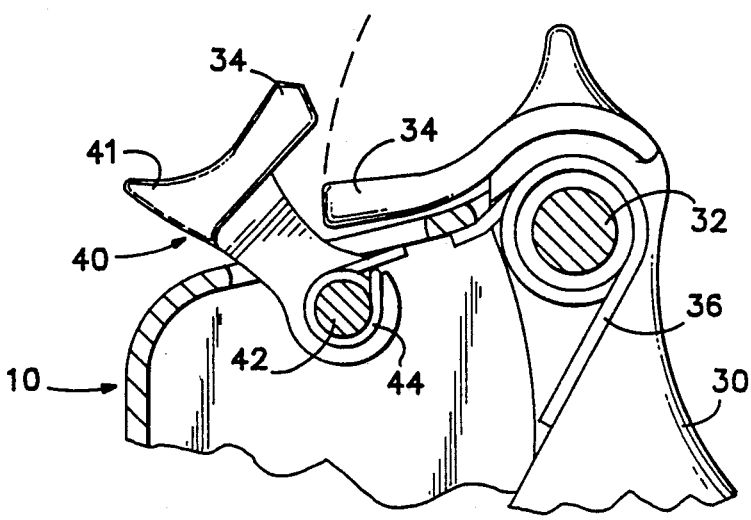

In operation, all that is required for an operator to couple the drawbar to the coupling is to rotate the pawl 40 forwardly to its unlocked position, FIG. 4. The latch then is free to be rotated to its unlatched position, FIG. 3, and the curved rear face of the latch permits this to be accomplished merely by placing the drawbar 18 against the latch and pushing it forwardly. Once the drawbar is installed on the pintle 16, the spring 36 urges the latch back to its latched position, and the spring 44 urges the pawl 40 back to its locked position, where it overlies the tang 34, FIG. 1. Thus the drawbar is prevented from becoming dislodged from the pintle by the latch and the pawl prevents the latch from inadvertently opening.

To remove the drawbar from the coupling, the operator must first rotate the pawl 40 to its unlocked position and then rotate the latch to its unlatched position. The drawbar can then be lifted up and off of the pintle.

Whenever the latch is rotated to its unlatched position it can be held there merely by releasing the pawl and thereby causing the lip 43 to move under the tang where it prevents rotation of the latch. The latch can be released simply by again rotating the pawl to its unlocked position.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A trailer coupling comprising:
  (a) a body having a flat base which arranged for attachment to a vertical surface on a pulling vehicle;
  (b) a drawbar-receiving pintle that extends outwardly and upwardly from said body;
  (c) a latch which is rotatably mounted on said body, said latch having a surface which faces away from said flat base, said surface being configured such that when a drawbar is placed against said surface and urged towards said flat said latch will move along with the drawbar from a latched position where it engages an extremity of said pintle to prevent removal of the drawbar from said pintle to an unlatched position where it is displaced from said pintle toward said body to allow placement of the drawbar on said pintle; and
  (d) a pawl which is rotatably mounted on said body for rotation between a locked position where it prevents rotation of said latch from its latched position to its unlatched position, and an unlocked position where it allows rotation of said latch from its latched position to its unlatched position.

2. The trailer coupling of claim 1 wherein said latch has a tang that projects outwardly therefrom and said pawl engages said tang when said latch is in its latched position, and said pawl is in its locked position.

3. The trailer coupling of claim 1 wherein said tang extends forwardly toward said body from said latch and said pawl overlies said tang when said latch is in its latched position, and said pawl is in its locked position.

4. The trailer coupling of claim 2 wherein said pawl has a rearwardly-extending lip that fits under said tang when said latch is in its unlatched position and said pawl is in its locked position, thereby preventing said latch from being returned to its latched position.

5. The trailer coupling of claim 1 wherein said pawl includes a thumb grip which permits said pawl to be rotated between its locked and unlocked positions by pushing against said thumb grip.

6. The trailer coupling of claim 1 including first biasing means for normally urging said pawl toward its latched position.

7. The trailer coupling of claim 1 including first biasing means for normally urging said pawl toward its locked position.

8. The trailer coupling of claim 1 wherein said surface is arcuate.

* * * * *

UNITED STATES PATENT AND TRADEMARK OFFICE
CERTIFICATE OF CORRECTION

PATENT NO. : 5,033,764
DATED : July 23, 1991
INVENTOR(S) : William Blacklaw It is certified that error appears in the above-identified patent and that said Letters Patent is hereby corrected as shown below:

Col. 4, line 3      After "which" insert --is--

Col. 4, line 43      Change "pawl" to --latch--

Col. 4, line 45      Change "first" to --second--

Signed and Sealed this

Sixteenth Day of March, 1993

*Attest:*

STEPHEN G. KUNIN

*Attesting Officer*      *Acting Commissioner of Patents and Trademarks*